(12) United States Patent
Fang et al.

(10) Patent No.: US 7,298,334 B2
(45) Date of Patent: *Nov. 20, 2007

(54) MULTIFREQUENCY INVERTED-F ANTENNA

(75) Inventors: Chien-Hsing Fang, Hsichih (TW); Yuan-Li Chang, Hsichih (TW); Huey-Jen Lin, Hsichih (TW)

(73) Assignee: Wistron Neweb Corporation, Taipei, Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/482,253

(22) Filed: Jul. 7, 2006

(65) Prior Publication Data

US 2006/0250309 A1    Nov. 9, 2006

Related U.S. Application Data

(63) Continuation of application No. 11/034,164, filed on Jan. 11, 2005, which is a continuation of application No. 10/394,370, filed on Mar. 20, 2003, now Pat. No. 6,861,986.

(30) Foreign Application Priority Data

Oct. 8, 2002    (TW) ................................ 91123215 A

(51) Int. Cl.
*H01Q 1/38* (2006.01)

(52) U.S. Cl. ................................ 343/700 MS; 343/702
(58) Field of Classification Search ......... 343/700 MS, 343/702, 767, 829–830, 846
See application file for complete search history.

(56) References Cited

U.S. PATENT DOCUMENTS

| | | | |
|---|---|---|---|
| 5,181,044 A | 1/1993 | Matsumoto et al. | |
| 5,949,383 A | 9/1999 | Hayes et al. | |
| 6,173,445 B1 | 1/2001 | Robins et al. | |
| 6,229,485 B1 | 5/2001 | Ito et al. | |
| 6,239,765 B1 | 5/2001 | Johnson et al. | |
| 6,343,208 B1 | 1/2002 | Zhinong | |
| 6,404,394 B1 | 6/2002 | Hill | |
| 6,426,725 B2 | 7/2002 | Hiroshima et al. | |
| 6,600,448 B2* | 7/2003 | Ikegaya et al. ...... | 343/700 MS |
| 6,662,028 B1 | 12/2003 | Hayes et al. | |
| 6,717,548 B2* | 4/2004 | Chen .................... | 343/700 MS |
| 6,788,257 B2 | 9/2004 | Fang et al. | |
| 6,861,986 B2* | 3/2005 | Fang et al. .......... | 343/700 MS |
| 6,864,841 B2 | 3/2005 | Dai et al. | |
| 7,230,574 B2* | 6/2007 | Johnson ............... | 343/700 MS |
| 2004/0090377 A1 | 5/2004 | Dai et al. | |
| 2004/0233108 A1 | 11/2004 | Bordi | |
| 2005/0190108 A1 | 9/2005 | Lin et al. | |
| 2007/0120753 A1* | 5/2007 | Hung et al. .................. | 343/702 |

FOREIGN PATENT DOCUMENTS

TW    527754    12/1990

* cited by examiner

Primary Examiner—Huedung Mancuso
(74) Attorney, Agent, or Firm—Merchant & Gould P.C.

(57) ABSTRACT

A multifrequency inverted-F antenna includes a radiating element having opposite first and second ends, a grounding element spaced apart from the radiating element, and an interconnecting element extending between the radiating and grounding elements and including first, second, and third parts. The first part is connected to the radiating element at a feeding point between the first and second ends. The second part is offset from the first part in a longitudinal direction, and is connected to the grounding element. The third part interconnects the first and second parts. A feeding line is connected to the interconnecting element.

11 Claims, 4 Drawing Sheets

US 7,298,334 B2

MULTIFREQUENCY INVERTED-F ANTENNA

CROSS-REFERENCE TO RELATED APPLICATION

This application is a Continuation of application Ser. No. 11/034,164, filed Jan. 11, 2005, which is the Continuation of application Ser. No. 10/394,370, filed Mar. 20, 2003, now U.S. Pat. No. 6,861,986, which claims priority to Taiwan patent Application No. 091123215 filed on Oct. 8, 2002, and which application(s) are incorporated herein by reference.

BACKGROUND OF THE INVENTION

1. Field of the Invention

This invention relates to an antenna, more particularly to a multifrequency inverted-F antenna for a portable electronic device.

2. Description of the Related Art

Wireless communication devices, such as cellular phones, notebook computers, electronic appliances, and the like, are normally installed with an antenna that serves as a medium for transmission and reception of electromagnetic signals. The antenna can be built outside or inside the devices. However, the latter (built-in type) are more attractive due to the tendency of folding and breaking associated with the former upon use.

FIG. 1 illustrates a conventional multifrequency Planar Inverted-F Antenna (PIFA) which includes a rectangular conductive radiating element 11 having opposite left and right ends, a rectangular conductive grounding element 12 that is vertically spaced apart from and that is electrically connected to the left end of the radiating element 11 through a conductive grounding leg 13, and a conductive signal feeding element 14 that is electrically connected to one side of the radiating element 11 at a feeding point between the left and right ends of the radiating element 11, that extends through an opening in the grounding element 12, and that is adapted to be electrically connected to a radio frequency transceiver (not shown). The length (L1) measured from the left end of the radiating element 11 to the feeding point is different from the length (L2) measured from the feeding point to the right end of the radiating element 11 so that two different frequency bands corresponding respectively to L1 and L2 (each length is about $\lambda/4$, wherein $\lambda$ is the corresponding wavelength) can be emitted by the radiating element 11 when a signal is sent from the transceiver through the signal feeding element 14 to the radiating element 11.

FIG. 2 illustrates a conventional inverted-F antenna which is similar to the antenna shown in FIG. 1, except that the radiating element 11' is in the form of a wire. The antenna of this type can only resonate in a single frequency band.

In view of the conventional inverted-F antennas, there is a need for a simpler structure and construction for the antennas that are capable of emitting and receiving multi-frequency bands. Moreover, adjustment of the frequency bands through the input and output impedance is not possible for the conventional inverted-F antennas due to the fixed location of the signal feeding element 14 on the radiating element 11.

SUMMARY OF THE INVENTION

Therefore, it is an object of the present invention to provide a multifrequency inverted-F antenna that is capable of overcoming the aforementioned drawbacks of the prior art.

According to this invention, there is provided a multifrequency inverted-F antenna that comprises: a conductive radiating element extending in a longitudinal direction and having opposite first and second ends lying in the longitudinal direction; a conductive grounding element spaced apart from the radiating element in a transverse direction relative to the longitudinal direction; a conductive interconnecting element extending between the radiating and grounding elements and including first, second, and third parts, the first part being electrically connected to the radiating element at a feeding point between the first and second ends of the radiating element, the second part being offset from the first part in the longitudinal direction and being electrically connected to the grounding element, the third part electrically interconnecting the first and second parts; and a feeding line electrically connected to the interconnecting element.

BRIEF DESCRIPTION OF THE DRAWINGS

In drawings which illustrate embodiments of the invention.

DETAILED DESCRIPTION OF THE PREFERRED EMBODIMENTS

Figure 1:
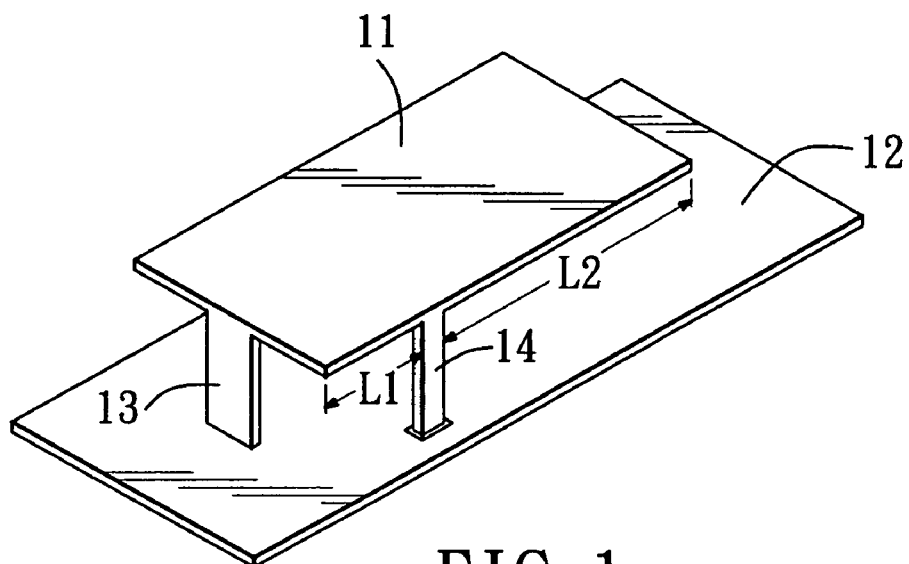
FIG. 1 is a perspective view of a conventional multifrequency planar inverted-F antenna.
Figure 2:
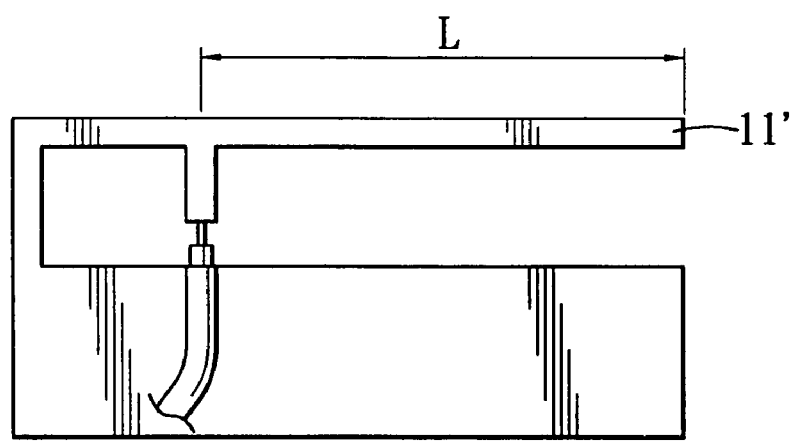
FIG. 2 is a top view of another conventional inverted-F antenna.

For the sake of brevity, like elements are denoted by the same reference numerals throughout the disclosure.

Figure 3:
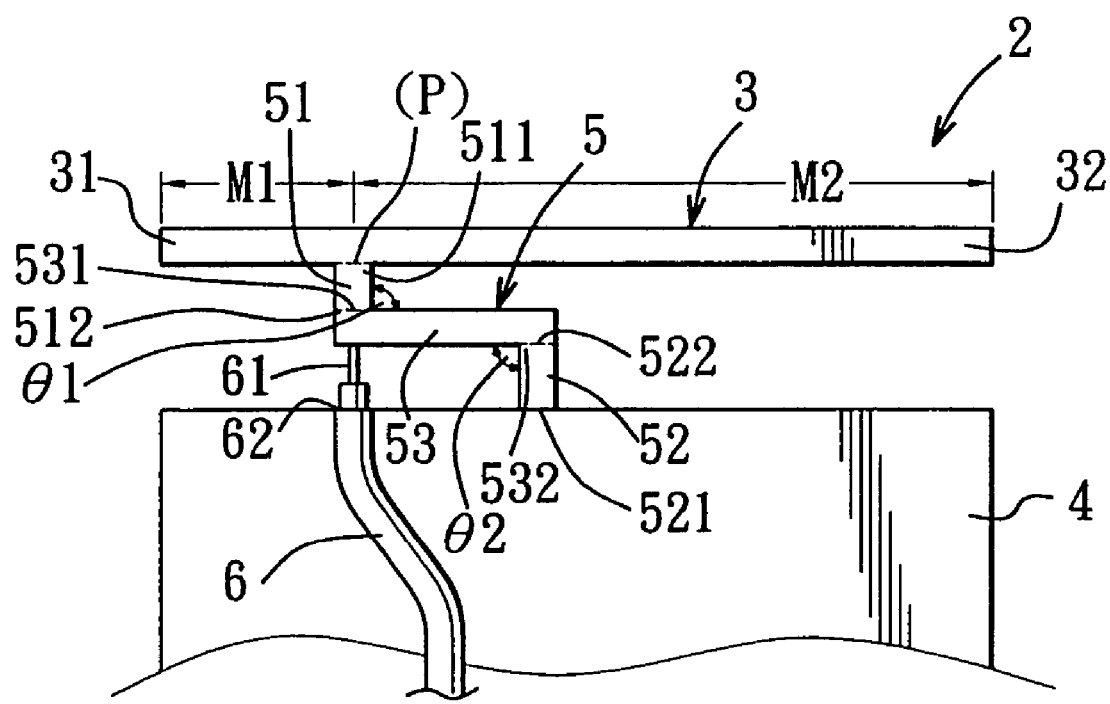
FIG. 3 is a fragmentary schematic view of a first preferred embodiment of a multifrequency inverted-F antenna of this invention, which has a radiating element in the form of a wire.
Figure 4:
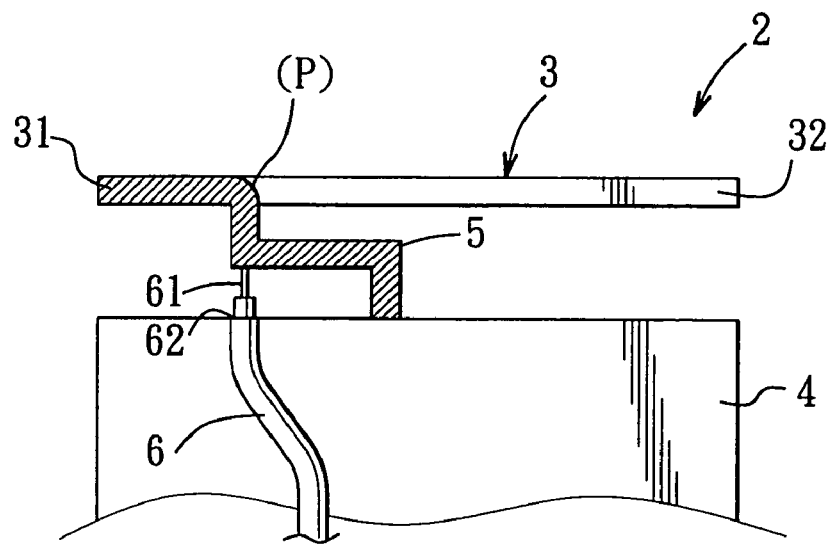
FIG. 4 is a schematic view to illustrate a signal path corresponding to a first frequency band from a grounding element to one end of the radiating element of the multifrequency inverted-F antenna of FIG. 3.
Figure 5:
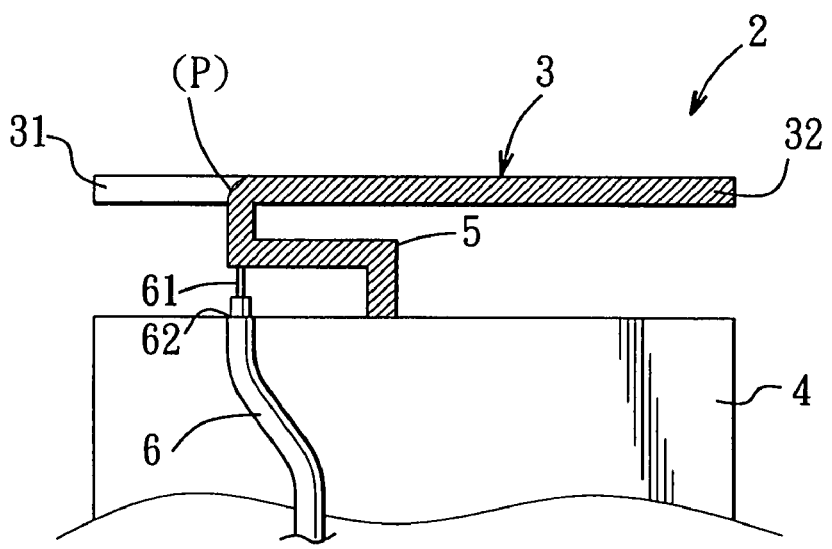
FIG. 5 is a schematic view to illustrate another signal path corresponding to a second frequency band from the grounding element to an opposite end of the radiating element of the multifrequency inverted-F antenna of FIG. 3.

FIGS. 3 to 5 illustrate a first preferred embodiment of a multifrequency inverted-F antenna 2 of this invention. The antenna 2 includes: a conductive radiating element 3 in the form of a wire that extends in a longitudinal direction and that has opposite first and second ends 31, 32 lying in the longitudinal direction; a conductive grounding element 4 spaced apart from the radiating element 3 in a transverse direction relative to the longitudinal direction; a conductive interconnecting element 5 extending between the radiating and grounding elements 3, 4 and including first, second, and third parts 51, 52, 53, the first part 51 being electrically connected to the radiating element 3 at a feeding point (P) between the first and second ends 31, 32 of the radiating element 3, the second part 52 being offset from the first part 51 in the longitudinal direction and being electrically connected to the grounding element 4, the third part 53 electrically interconnecting the first and second parts 51, 52; and a feeding line 6 electrically connected to the interconnecting element 5.

The first part 51 of the interconnecting element 5 has a radiating end 511 that is electrically connected to the radiating element 3 at the feeding point (P), and a distal end 512 that is opposite to the radiating end 511. The second part 52 of the interconnecting element 5 has a grounding end 521 that is electrically connected to the grounding element 4, and a distal end 522 that is opposite to the grounding end 521. The third part 53 of the interconnecting element 5 has opposite left and right ends 531, 532 electrically and respectively connected to the distal ends 512, 522 of the first and second parts 51, 52.

The first and third parts 51, 53 form a first angle (θ1), and the second and third parts 51, 52 form a second angle (θ2). Each of the first and second angles (θ1, θ2) can be varied. In this preferred embodiment, each of the first and second angles (θ1, θ2) is equal to 90°.

The grounding element 4 is in the form of a plate, and preferably extends in a direction parallel to the radiating element 3. The first and second parts 51, 52 preferably extend in a direction perpendicular to the radiating and grounding elements 3, 4.

Preferably, the feeding line 6 is in the form of a coaxial cable line connected to a radio frequency transceiver (not shown), and includes a core conductor 61 that is electrically connected to the interconnecting element 5. The core conductor 61 of the feeding line 6 is preferably connected to the third part 53, and is more preferably connected to the left end 531 of the third part 53 of the interconnecting element 5 at one side face of the third part 53 that is opposite to the distal end 512 of the first part 51 of the interconnecting element 5. The feeding line 6 further includes a grounding layer 62 that is electrically connected to the grounding element 4.

Figure 6:
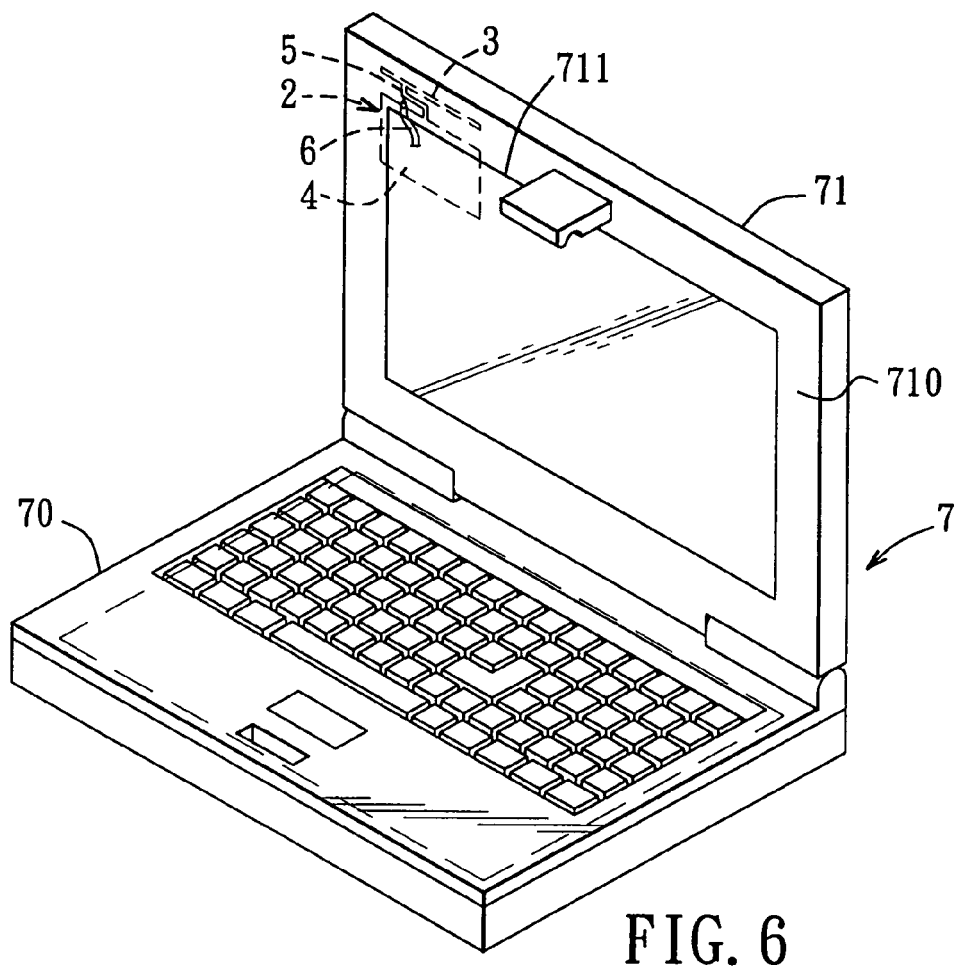
FIG. 6 is a perspective view of a notebook computer with the multifrequency inverted-F antenna of FIG. 3 installed therein.
Figure 7:
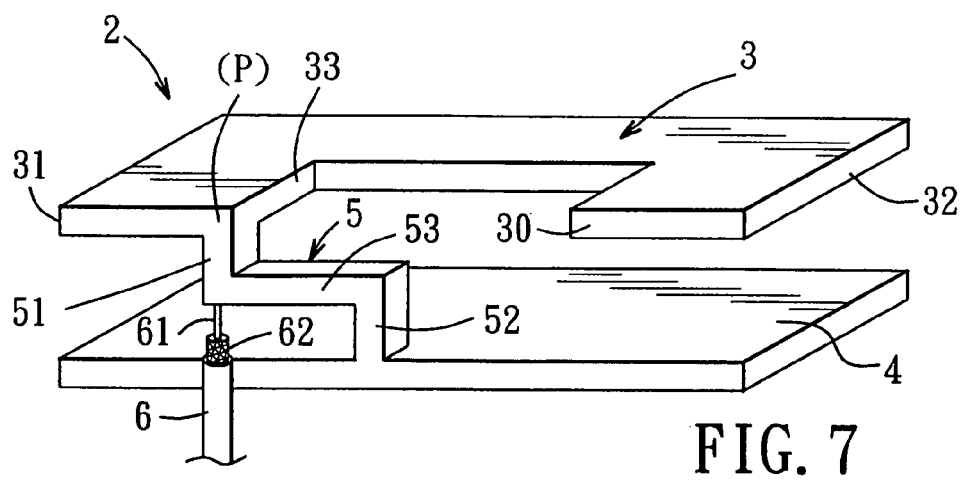
FIG. 7 is a perspective view of a second preferred embodiment of the multifrequency inverted-F antenna of FIG. 3, with the radiating element being in the form of a plate.

The feeding point (P) divides the radiating element 3 into left and right sections that have lengths (M1, M2) measured respectively from the left end 31 of the radiating element 3 to the feeding point (P) and from the feeding point (P) to the right end 32 of the radiating element 3. The left and right sections of the radiating element 3 correspond respectively to a high frequency band and a low frequency band. FIGS. 6 and 7 respectively illustrate signal paths that pass respectively through the first and second sections of the radiating element 3 when the radiating element 3 resonates at the corresponding frequency bands.

During transmission of a signal from the transceiver to the radiating element 3, part of the signal may be transmitted to the grounding element 4. However, due to hindrance of the second angle (θ2), most of the signal will be transmitted to the radiating element 3 so as to permit emission of a radiation in the frequency bands. During reception of a signal, the signal passes through the respective section of the radiating element 3 and is first fed to the feeding line 6 through the first part 51 of the interconnecting element 5 prior to transmission to the grounding element 4 which is placed behind the feeding line 6. Although part of the signal may be fed to the grounding element 4, however, due to hindrance of the first and second angles (θ1, θ2), most of the signal will be fed to the feeding line 6 so as to be received by the transceiver.

It is noted that it is not necessary to connect the core conductor 61 of the feeding line 6 to the left end 531 of the third part 53. The core conductor 61 can be connected to the third part 53 at a selected position between the left and right ends 531, 532 of the third part 53 so as to obtain a desired frequency band and impedance matching for the input and output impedance.

FIG. 7 illustrates a second preferred embodiment of the multifrequency inverted-F antenna 2 which has a construction similar to the antenna 2 shown in FIG. 3, except that the radiating element 3 is in the form of a plate. The radiating element 3 is rectangular in shape and has a side edge 30. The radiating end 511 of the first part 51 is connected to the side edge 30. The side edge 30 of the radiating element 3 is formed with a groove 33 between the feeding point (P) and the second end 32 of the radiating element 3 so as to increase the length of the current path between the feeding point (P) and the second end 32 of the radiating element 3 and so as to minimize the dimension of the radiating element 3 in the longitudinal direction.

FIG. 6 illustrates a portable electronic device, such as a notebook computer 7, with the antenna 2 of FIG. 3. The notebook computer 7 includes a main board module 70 and a display 71 that is connected to the main board module 70 and that has a display housing 710 and a display unit 711 mounted in the display housing 710. The antenna 2 is mounted in the display housing 710 with the grounding element 4 being electrically connected to a back plate of the display unit 711.

Tables 1 and 2 are results of a test on the antenna 2 of FIG. 3 by measuring the Voltage Standing Wave Ratio (VSWR) in a first frequency band ranging from 2.4 to 2.5 GHz (which is close to a frequency band 2.412 to 2.4835 GHz according to the specifications of wireless standards of IEEE802.11b) and in a second frequency band ranging from 5.15 to 5.825 GHz (which is close to a frequency band 5.15 to 5.85 GHz according to the specifications of wireless standards of IEEE802.11a). The VSWR value is an indication of the quality of the antenna, and is preferably less than 2 so as to prevent interference during transmission or reception of signals. Tables 1 and 2 show that the VSWR values for the tested frequency bands are less than 2, and that the antenna 2 is capable of providing multifrequency bands.

TABLE 1

| | Frequency, GHz | | |
|---|---|---|---|
| | 2.4 | 2.45 | 2.5 |
| VSWR | 1.59 | 1.26 | 1.102 |

TABLE 2

| | Frequency, GHz | | | | |
|---|---|---|---|---|---|
| | 5.15 | 5.25 | 5.35 | 5.47 | 5.825 |
| VSWR | 1.481 | 1.564 | 1.323 | 1.192 | 1.769 |

In addition, the antenna 2 can be made from a flexible print circuit (FPC) material so as to further minimize the dimensions of the antenna 2.

By virtue of the construction of the interconnecting element 5, the drawbacks as encountered in the prior art can be eliminated.

With the invention thus explained, it is apparent that various modifications and variations can be made without departing from the spirit of the present invention.

What is claimed is:

1. A multifrequency antenna comprising:
a radiating element having a first end and a second end;
a grounding element; and
an interconnecting element connected to the radiating element and grounding element and having a first, second, and third parts, the first part forming a feeding point dividing the radiating element into a first section and a second section, wherein the first section is from the feeding point to the first end, the second section is from the feeding point to the second end, and the second part of the interconnecting element is apart from the first part of the interconnection element in a longitudinal direction of the third part of the interconnecting element.

2. The multifrequency antenna of claim 1, further comprising a feeding line electrically connected to the interconnecting element.

3. The multifrequency antenna of claim 2, wherein the feeding line is a coaxial cable comprising a grounding layer electrically connected to the grounding element.

4. The multifrequency antenna of claim 1, wherein the first and third parts of the interconnecting element are substantially perpendicular.

5. The multifrequency antenna of claim 1, wherein the second and third parts of the interconnecting element are substantially perpendicular.

6. The multifrequency antenna of claim 1, wherein the second part of the interconnecting element is connected to the grounding element.

7. The multifrequency antenna of claim 1, wherein the radiating element is a plate forming a groove between the feeding point and the second end.

8. The multifrequency antenna of claim 1, wherein the length of the path between the second end and the feeding point in the second section is longer than the length of the path between the first end and the feeding point in the first section.

9. The multifrequency antenna of claim 8, wherein the radiating element is a plate forming a groove between the feeding point and the second end.

10. The multifrequency antenna of claim 1, wherein the grounding element is a plate.

11. The multifrequency antenna of claim 10, wherein the radiating element is a plate and substantially parallel to the grounding element.

* * * * *

UNITED STATES PATENT AND TRADEMARK OFFICE
CERTIFICATE OF CORRECTION

PATENT NO. : 7,298,334 B2
APPLICATION NO. : 11/482253
DATED : November 20, 2007
INVENTOR(S) : Chien-Hsing Fang et al.

It is certified that error appears in the above-identified patent and that said Letters Patent is hereby corrected as shown below:

Column 1, line 28, replace the word "multifrequency" with "single-frequency".

Column 1, line 40, cancel the text beginning with "The length (L1)" to and ending "the radiating element 11." in column 1, line 48, and insert the following text in its place: The resonant frequency ($\lambda$) of this conventional PIFA can be estimated based on the width (Wr) and length (Lr) of the rectangular conductive radiating element 11, the width (Wg) of conductive grounding leg 13, and the distance (D) between radiating element 11 and grounding element 12. Normally $\lambda/4$ is about the value of Lr + Wr. If Wg = Wr, then $\lambda/4$ = Lr + D. When Wg approaches zero (a very narrow grounding leg), the resonant condition is: $\lambda/4$ = Lr + Wr + D. The impedance matching can be tuned by adjusting the distance between the feed point and the grounding leg 13.

Signed and Sealed this

Thirtieth Day of December, 2008

JON W. DUDAS
*Director of the United States Patent and Trademark Office*